(12) United States Patent
Aguero Trejo et al.

(10) Patent No.: US 12,231,552 B1
(45) Date of Patent: *Feb. 18, 2025

(54) HIGH DIMENSIONAL SYSTEM AND METHOD FOR GENERATING QUANTUM RANDOM NUMBERS CERTIFIED VIA VALUE INDEFINITENESS

(71) Applicant: TUATARA QRNG, LLC, Bethesda, MD (US)

(72) Inventors: Jose Manuel Aguero Trejo, Auckland (NZ); Edward Henry Allen, Bethesda, MD (US); Cristian S. Calude, Auckland (NZ)

(73) Assignee: TUATARA QRNG, LLC, Bethesda, MD (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/751,440

(22) Filed: Jun. 24, 2024

Related U.S. Application Data

(63) Continuation of application No. 18/597,030, filed on Mar. 6, 2024.

(51) Int. Cl.
*H04L 9/08* (2006.01)

(52) U.S. Cl.
CPC .......... *H04L 9/0852* (2013.01); *H04L 9/0869* (2013.01)

(58) Field of Classification Search
CPC ............................ H04L 9/0852; H04L 9/0869
See application file for complete search history.

(56) References Cited

U.S. PATENT DOCUMENTS 11,526,330 B1 * 12/2022 Agüero Trejo ........... G06F 7/58
2021/0306146 A1 * 9/2021 Chen ..................... H04L 9/0869

OTHER PUBLICATIONS

Shafi, K. Muhammed, et al. "Multi-bit quantum random number generator from path-entangled single photons." EPJ Quantum Technology 10.1 (2023): 43 (Year: 2023).*
Barreiro, Julio T., et al. "An open-system quantum simulator with trapped ions." Nature 470.7335 (2011): 486-491. (Year: 2011).*
Jose Manuel Aguero Trejo, et al., "How real is incomputability in physics?", Theoretical Computer Science, 1003, pp. 1-10, 2024.

(Continued)

*Primary Examiner* — Sangseok Park
(74) *Attorney, Agent, or Firm* — George Likourezos; Carter, DeLuca & Farrell LLP

(57) ABSTRACT

A system which includes a photon source configured to generate a spin-1 particle; an N-dimensional quantum random number generator (ND-QRNG); a processor; and a memory. The ND-QRNG includes a detector and an optical unit including: a preparation stage configured to enable certification via value indefiniteness; and a measurement stage configured to generate numbers and outcomes attained by measuring a state of a particle utilized to prepare an N-dimensional quantum system. The memory, includes instructions stored thereon, which, when executed by the processor cause the system to: generate a spin-1 particle; receive the spin-1 particle by the optical unit; generate by the optical unit a set of outcomes based on the state of the spin-1 particle; detect the set of outcomes; and output a sequence of N-ary numbers based on the detected set of outcomes.

18 Claims, 11 Drawing Sheets

(56) References Cited

OTHER PUBLICATIONS

Cristian S. Calude, et al., "Binary quantum random number generator based on value indefinite observables", Scientic Reports, pp. 1-11, 2024.

Costantino Budroni, et al., "Koshen-Specker contextuality", Reviews of Modern Physics, vol. 94, pp. 1-62, Oct.-Dec. 2022.

Jose Manuel Aguero Trejo, et al., "Photonic Ternary quantum random number generators", Proc. R. Soc. A 479: 20220543, https://doi.org/10.1098/rspa.2022.0543, pp. 1-16, 2023.

* cited by examiner

PREPARATION STAGE

MEASUREMENT STAGE

850 ⇘

852 ⇘
Receiving photons on at least one of n input ports of a universal interferometer, each input port configured to receive a corresponding prepared photon having three or more dimensions of quantum information in Hilbert space from a preparation stage of the ND QRNG, each corresponding prepared photon is prepared based on a selected probability distribution set selected from probability distribution sets of p1, p2,...pn that add to 1 and where the p1, the p2,..., the pn are rational numbers less than 1 and greater than zero 854 ⇘
Measuring, by n(n-1)/2 two-dimensional (2D) interferometers of the universal interferometer, along a Hermitian Unitary operator of a Cartesian coordinate standard system the prepared photon and preserving the three dimensions of the quantum information the Hilbert space of the measured photon 856 ⇘
Producing at one output port of n output ports of the universal interferometer a measured photon corresponding to a n-dimensional eigenstate

FIG. 8

HIGH DIMENSIONAL SYSTEM AND METHOD FOR GENERATING QUANTUM RANDOM NUMBERS CERTIFIED VIA VALUE INDEFINITENESS

CROSS-REFERENCE TO RELATED APPLICATIONS

The present application is a continuation application claiming the benefit of and priority to U.S. patent application Ser. No. 18/597,030, filed Mar. 6, 2024, the entire contents of which is hereby incorporated by reference herein.

TECHNICAL FIELD

The present disclosure relates generally to the field of generating random numbers using a process described by a quantum mechanical system. More specifically, the present disclosure provides a universal interferometer and systems and methods for universal N-dimensional quantum random number generation using the universal interferometer with any number dimensions N larger than two.

BACKGROUND

Random numbers are a valuable resource for a wide range of scientific applications. Random numbers can be written by their expansion in an integer base; the binary expansion of a real number, consisting of a sequence of zeroes and ones, is commonly used. A number is considered truly random if the sequence of numbers in its integer base expansion has no patterns. It has been mathematically proved that patterns emerge in any large enough structure; hence, true randomness is an impossibility. For this reason, the quality of randomness of a string or sequence is commonly assessed by batteries of algorithmic and statistical tests designed to probe the aforesaid number's ability to satisfy certain sets of properties that describe symptoms of randomness including, but not limited to, unpredictability, incomputability, incompressibility, and Borel normality.

Deterministic algorithms designed to simulate randomness, denoted pseudo-random number generators, have been the primary source of randomness for a long time. However, the randomness of numbers generated in this manner is low since the algorithm has infinitely many correlations. The need for a higher quality of randomness than the quality achievable by algorithms has driven a surge in the development of random number generators believed to be capable of producing better-quality random numbers.

Quantum mechanics offers a mathematical framework allowing us to describe processes that cannot be attributed to deterministic mechanisms expressed in the form of hidden variables and, thus, are believed to be intrinsically indeterminist, hence random. Quantum random number generators produce random numbers by exploiting quantum processes.

In 1964, physicist John Bell proposed a test based on inequalities to verify that, under certain conditions, quantum mechanical predictions cannot be reproduced by statistical models of hidden variables. Bell-type tests have shown that the hypothesis of local hidden variables is inconsistent with the theory of quantum mechanics. Several quantum random number generation protocols use Bell-type inequalities to certify the quality of randomness of their outcomes. However, due to their statistical nature, violation of Bell-type inequalities only indicates non-classical correlations and does guarantee the incomputability of sequences generated, an indispensable property to demonstrate an advantage over any deterministic random number generator.

Accordingly, there is a need for improvement in the unpredictability of the outcomes over existing random number generators.

SUMMARY

An aspect of the present disclosure provides a key generator system. The key generator system includes a photon source configured to generate a spin-1 particle; an N-dimensional quantum random number generator (ND-QRNG); a detector configured to output a sequence of N-ary numbers; a processor; and a memory. The ND-QRNG includes an optical unit. The optical unit includes a preparation stage configured to enable certification via value indefiniteness; and a measurement stage configured to generate numbers and outcomes attained by measuring a state of a particle utilized to prepare an N-dimensional quantum system in a state that satisfies a set of conditions that guarantees there is no definite value associated to the measurement outcome. The memory, includes instructions stored thereon, which, when executed by the processor cause the system to: generate, by the photon source, a spin-1 particle; receive the spin-1 particle by the optical unit; generate by the optical unit a set of outcomes based on the state of the spin-1 particle; detect by the detector the set of outcomes; and output by the detector a sequence of N-ary numbers based on the detected set of outcomes.

In an aspect of the present disclosure, the instructions, when executed by the processor, may cause the preparation stage to: select a set of probabilities; and determine one or more eigenstates of a Hermitian Unitary operator describing the quantum system. The Hermitian Unitary operator may correspond to $U_m$ with respect to a standard Cartesian basis. Each probability of the set of probabilities is greater than zero and less than one and a sum of the set of probabilities equals one.

In another aspect of the present disclosure, the instructions, when executed by the processor, may further cause the preparation stage to: evaluate quantum states that are neither orthogonal nor parallel to any of the determined one or more eigenstates of measurement operator Um; and determine projections of each value candidate quantum state onto the one or more eigenstates of the measurement operator with respect to standard Cartesian basis.

In yet another aspect of the present disclosure, the instructions, when executed by the processor, may further cause the preparation stage to: remove the candidate quantum state for which the probabilities of measurements of their projections are not in the set p1, p2, . . . , pN.

In a further aspect of the present disclosure, the instructions, when executed by the processor, further cause the preparation stage to set the remaining quantum state as a valid preparation quantum state.

In yet a further aspect of the present disclosure, the instructions, when executed by the processor, may cause the measurement stage to receive one or more photons on at least one input port of a universal interferometer of the measurement stage of the optical unit.

In another aspect of the present disclosure, the instructions, when executed by the processor, may further cause the measurement stage to: measure, using $N(N-1)/2$ two-dimensional (2D) interferometers of the universal interferometer of the measurement stage, along a Hermitian Unitary operator of a Cartesian coordinate standard system the one or more photons prepared by the preparation stage and preserving three dimensions of quantum information in a Hilbert space of the received one or more photons.

In yet another aspect of the present disclosure, the instructions, when executed by the processor, may further cause the measurement stage to produce at an output port of a plurality of output ports of the universal interferometer a measured photon corresponding to an N-dimensional eigenstate.

In a further aspect of the present disclosure, each input port of the universal interferometer may be configured to receive a corresponding prepared photon having three or more dimensions of quantum information in Hilbert space from the preparation stage of the ND-QRNG.

In yet a further aspect of the present disclosure, each corresponding prepared photon may be prepared based on a selected probability distribution set selected from probability distribution sets of p1, p2, . . . , pN that add to 1 and where the p1, the p2, . . . , the pN are rational numbers less than 1 and greater than zero.

In another aspect of the present disclosure, the ND-QRNG includes N input ports where N may be larger than two. Each input port may be configured to receive at least one prepared photon having three dimensions of quantum information in Hilbert space from a preparation stage of the ND-QRNG.

In yet another aspect of the present disclosure, the instructions, when executed by the processor, may further cause the system to: generate a key based on the sequence of N-ary numbers; and encrypt information based on the key.

In accordance with aspects of the disclosure, a processor-implemented method for generating a key is presented. The method includes: generating, by a photon source, a spin-1 particle; receiving the spin-1 particle by an optical unit; generating by the optical unit a set of outcomes based on the state of the spin-1 particle; detecting by a detector the set of outcomes; and outputting by the detector a sequence of N-ary numbers based on the detected set of outcomes.

In an aspect of the present disclosure, the method may further include: selecting a set of probabilities. Each probability of the set of probabilities may be greater than zero and less than one and a sum of the set of probabilities equals one; and determining one or more eigenstates of a Hermitian Unitary operator describing the quantum system The Hermitian Unitary operator may correspond to $U_m$ with respect to a standard Cartesian basis.

In another aspect of the present disclosure, the method may further include: evaluating quantum states that are neither orthogonal nor parallel to any of the determined one or more eigenstates of measurement operator Um; and determining projections of each value candidate quantum state onto the one or more eigenstates of the measurement operator with respect to standard Cartesian basis.

In yet another aspect of the present disclosure, the method may further include: removing the candidate quantum state for which the probabilities of measurements of their projections are not in the set p1, p2, . . . , pN.

In a further aspect of the present disclosure, the method may further include: setting the remaining quantum state as a valid preparation quantum state; and receiving one or more photons on at least one input port of a universal interferometer of the measurement stage of the optical unit.

In yet a further aspect of the present disclosure, the method may further include: measuring, using $N(N-1)/2$ two-dimensional (2D) interferometers of the universal interferometer of the measurement stage, along a Hermitian Unitary operator of a Cartesian coordinate standard system the one or more photons prepared by the preparation stage and preserving three dimensions of quantum information in a Hilbert space of the received one or more photons; and producing at an output port of a plurality of output ports of the universal interferometer a measured photon corresponding to an N-dimensional eigenstate.

In another aspect of the present disclosure, the method may further include: generating a key based on the sequence of N-ary numbers; and encrypting information based on the key.

In accordance with aspects of the disclosure, a key generator device is presented. The device includes a laser configured to generate photons; an N-dimensional quantum random number generator (ND-QRNG); one or more detectors configured to output a sequence of N-ary numbers based on the measurement outcomes; and a computing device configured to generate key bits based on the sequence of N-ary numbers. The ND-QRNG includes: a preparation stage configured to generate a selection of N-dimensional preparation states based on the generated photons; and a measurement stage configured to receive the selection of N-dimensional preparation states generated by the preparation stage and generate a string of K>0 N-nary digits as measurement outcomes. The computing device includes: a key bit assembler configured to at least one of store, concatenate, or assemble a string of K>0 N-nary digits of the measurement outcomes from the measurement stage; a binary mapper configured to transform the string of K>0, N-nary digits into L bits through a structure-preserving mapping; and a key communicator configured to produce communication media for transmission to a remote computing device; and a data port configured to transmit the generated key from the computing device.

Further details and aspects of exemplary aspects of the present disclosure are described in more detail below with reference to the appended figures.

BRIEF DESCRIPTION OF THE DRAWINGS

A better understanding of the features and advantages of the present disclosure will be obtained by reference to the following detailed description that sets forth illustrative aspects, in which the principles of the present disclosure are utilized, and the accompanying drawings of which:

FIG. 8 is a flow diagram illustrating a method for generating random numbers using the system of FIG. 1, in accordance with examples of the present disclosure;

DETAILED DESCRIPTION

Figure 1:
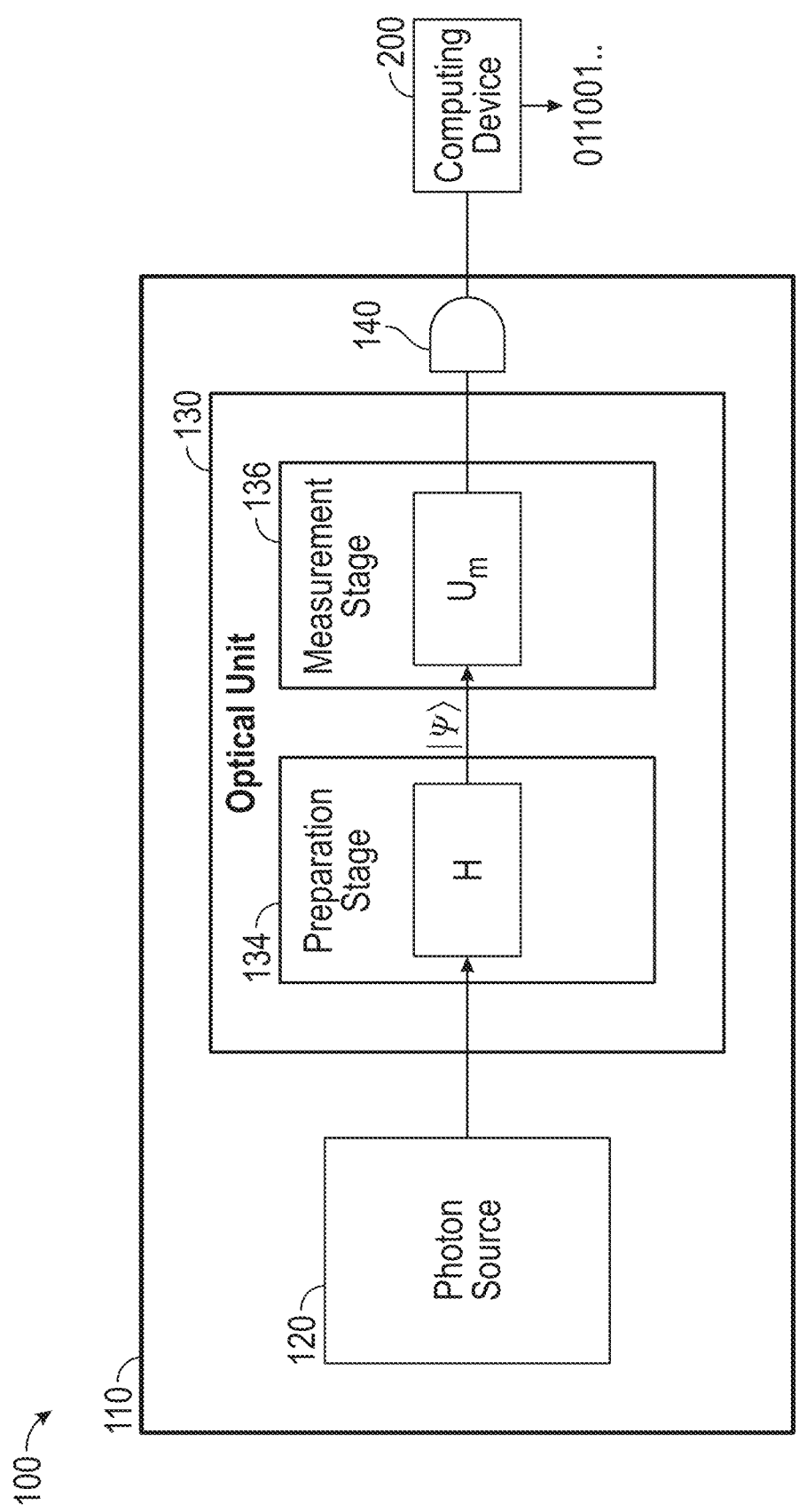
FIG. 1 is a block diagram illustrating a key generator system using a universal N-dimensional (ND) quantum random number generator (QRNG), in accordance with examples of the present disclosure.

The present disclosure relates generally to the field of generating random numbers using a process described by a quantum mechanical system. More specifically, the present disclosure provides a universal interferometer and systems and methods for universal N-dimensional quantum random number generation using the universal interferometer with any number of dimensions N larger than two.

Although the present disclosure will be described in terms of specific examples, it will be readily apparent to those skilled in this art that various modifications, rearrangements, and substitutions may be made without departing from the spirit of the present disclosure. The scope of the present disclosure is defined by the claims appended hereto.

For purposes of promoting an understanding of the principles of the present disclosure, reference will now be made to exemplary aspects illustrated in the drawings, and specific language will be used to describe the same. It will nevertheless be understood that no limitation of the scope of the present disclosure is thereby intended. Any alterations and further modifications of the novel features illustrated herein, and any additional applications of the principles of the present disclosure as illustrated herein, which would occur to one skilled in the relevant art and having possession of this disclosure, are to be considered within the scope of the present disclosure.

Referring to FIG. 1, a block diagram illustrating a key generator system 100 using a universal N-dimensional (ND) quantum random number generator (QRNG) 110. With reference to FIG. 1, the system may include an ND-QRNG 110 and a classical computing device 200.

The ND-QRNG 110 may include a photon source 120 (e.g., a laser), an optical unit 130 configured to produce a single random quantum number (SRQN), and a detector 140 (e.g., an avalanche detector). For example, the photon source 120 may include an attenuated laser device. The photon source 120 is configured to generate a spin-1 particle. The spin-1 particle includes three dimensions of quantum information in Hilbert space. This information may be observable information.

The photon source 120 may be configured to produce photons using an attenuated laser, for example, or other photon generator and beam splitters in the preparation stage 134 of the optical unit 130, as will be described in detail below. By way of a non-limiting example, the beam-splitters may be half-silvered mirrors.

Figure 5:
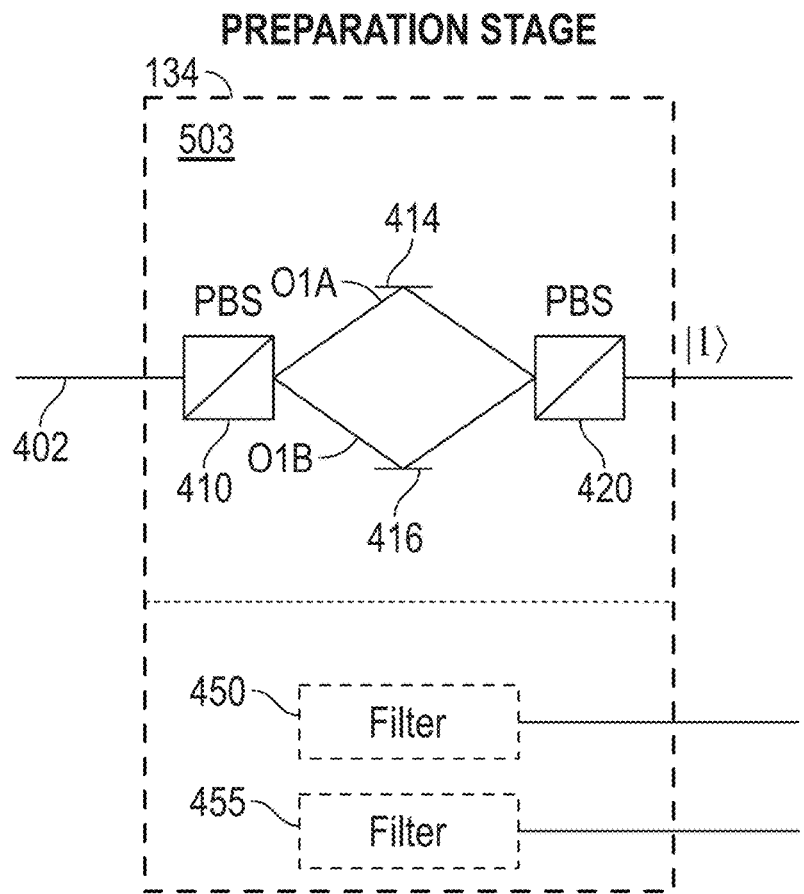
FIG. 5 is a diagram illustrating a preparation stage of the optical unit of FIG. 4, in accordance with examples of the present disclosure.
Figure 6:
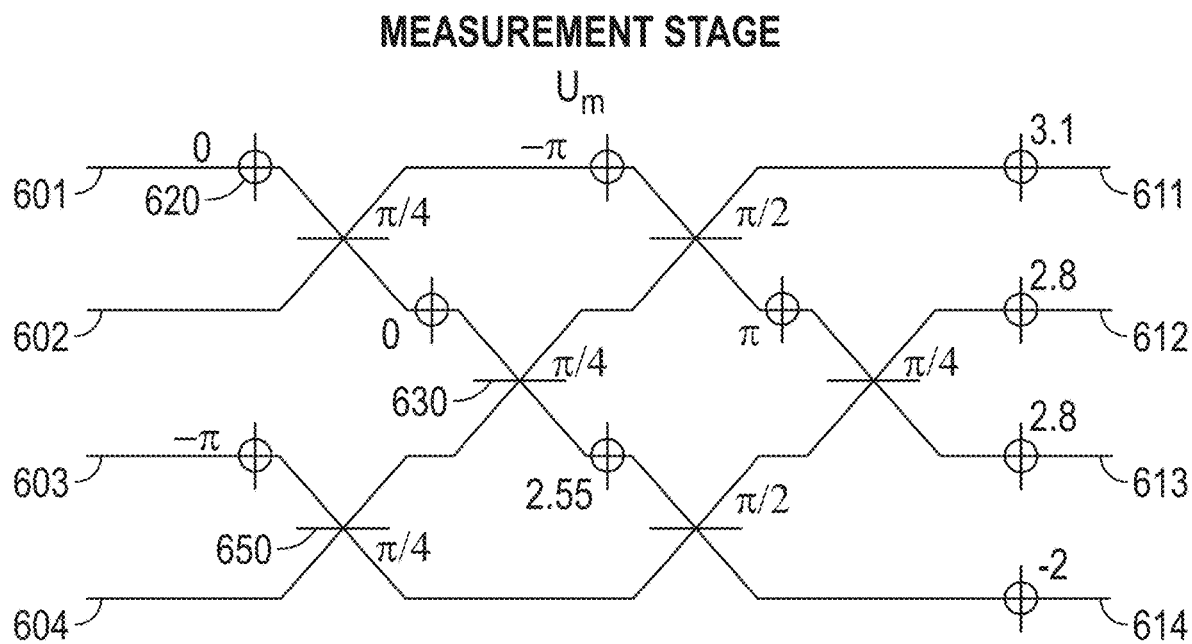
FIG. 6 is a diagram illustrating an example of a measurement stage of the optical unit of FIG. 4, in accordance with examples of the present disclosure.

The optical unit 130 may include a preparation stage 134 and a measurement stage 136, as is described in more detail in relation to FIGS. 5 and 6.

The detector 140 may be configured to output a sequence of N-ary numbers (i.e., a quantum random ternary digit) from the set $\{0, 1, 2, \ldots, N\}$, for example. The sequence of N-ary numbers is then sent to the computing device 200 for further processing to generate a random set of bits based on the sequence of numbers output from the ND-QRNG 110, in accordance with programmed instructions for the generation of a key, such as an encryption key. The detector 140 may be a single photon detector or a single quantum random number (QRN) detector. In aspects, the system 100 may use more than one detector 140. For example, the number of detectors used is the same as the number of the number of outputs of the system 100.

Figure 4:
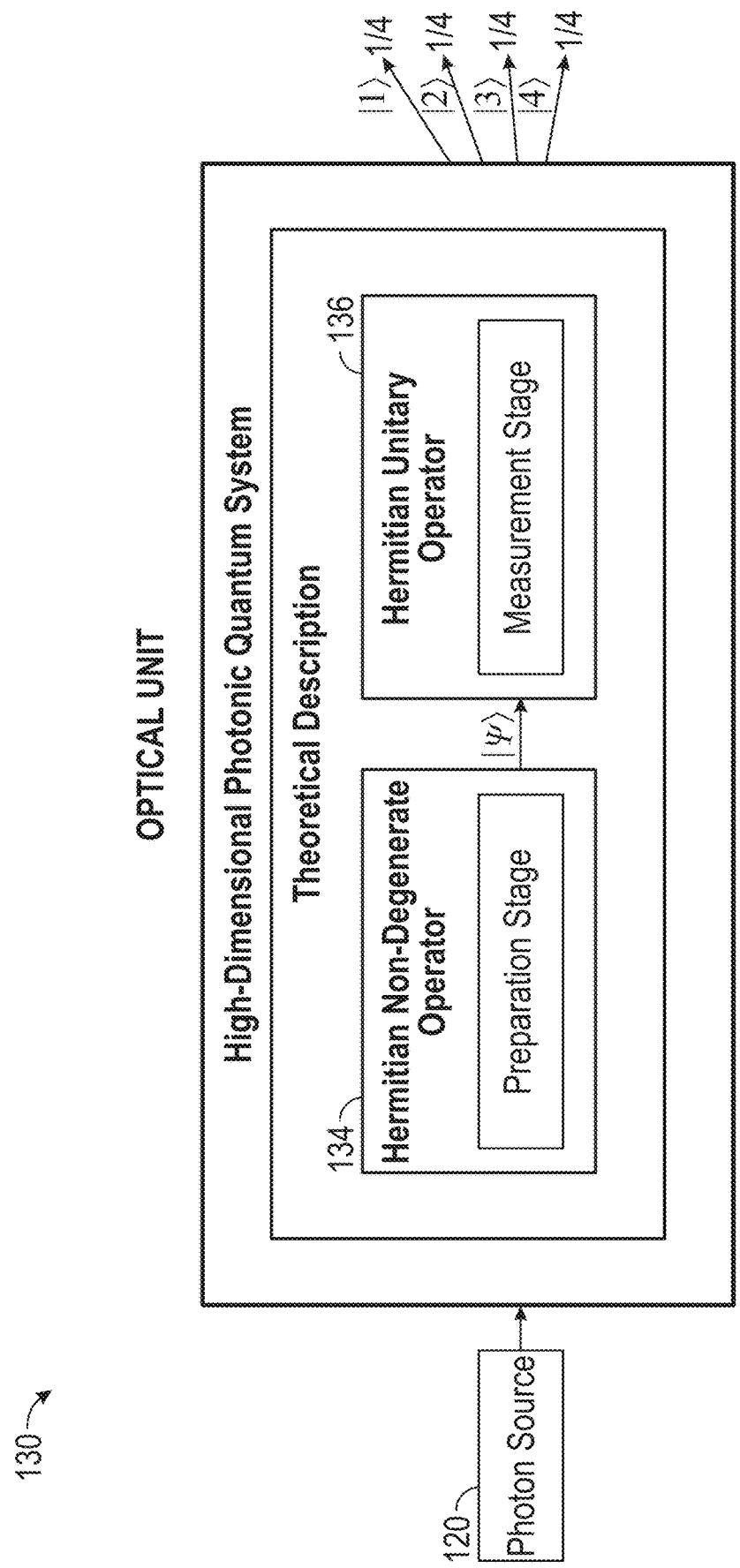
FIG. 4 is a diagram illustrating an optical unit of the system of FIG. 1, in accordance with examples of the present disclosure.

Since photons are spin-1 particles, their operators belong to a Hilbert space over the complex numbers of dimension N, three or more, thus guaranteeing the value indefiniteness of its measurement outcomes when a prepared state satisfies the aforementioned conditions. Due to dimensionality, three or more quantum states are resolvable outcomes with the given probability distribution dependent on the preparation state of preparation stage 134. In FIG. 4, the output is quaternary.

The preparation stage 134 (FIG. 5) prepares the quantum state with a value definite state $|\psi\rangle$ with respect to a Hermitian operator with non-degenerate spectra, for which the Cartesian Standard Basis corresponds to its eigenvectors, in a Hilbert space over the complex numbers with dimensions larger than two, and a state that is neither orthogonal nor parallel to an arbitrary state $|\psi\rangle$, the spin-1 particle (photon) interacting with the Hermitian Unitary operator (as described by its eigenvectors). The eigenvectors of the aforementioned operators may be found computing and solving the characteristic equation of the operator to derive its eigenvalues and evaluating this equation with each possible solution (eigenvalues). Non-degeneracy indicates that there are no linearly independent eigenvectors with the same eigenvalue.

Therefore, the effect of the projection operator onto the Hermitian Unitary operator (measurement stage) on the state $|\psi\rangle$ has no predetermined outcome, that is, the state of the spin-1 particle is value indefinite. This measurement operation is carried out by the universal interferometer $U_m$ for any preparation state.

One or more components of the ND-QRNG 110 may be on one or more chips. For example, silicon photonics may be used to generate photons. The beam-splitters and/or interferometer components may be integrated on a chip. The chip may be manufactured using complementary metal-oxide semiconductor techniques. The ND-QRNG 110 may be integrated into a single integrated circuit chip using complementary metal-oxide semiconductor techniques.

Figure 2:
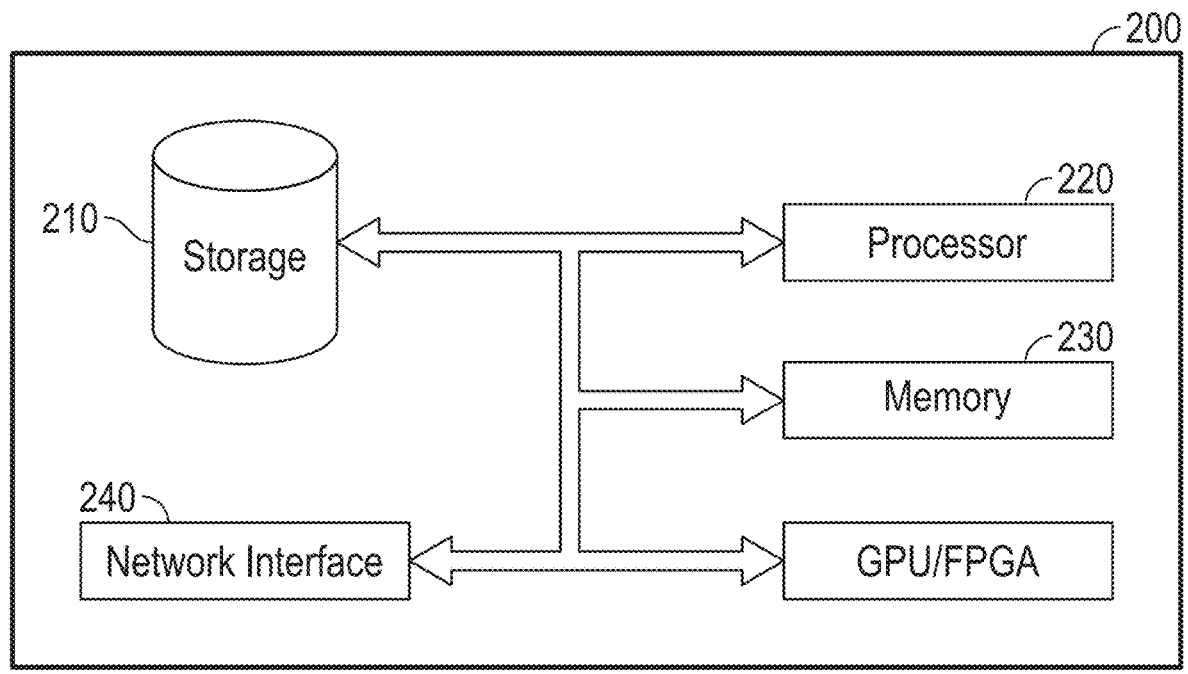
FIG. 2 is a block diagram of a computing device configured for use with the system of FIG. 1.

FIG. 2 illustrates that computing device 200 includes a processor 220 connected to a computer-readable storage medium or a memory 230. The computer-readable storage medium or memory 230 may be a volatile type of memory, e.g., RAM, or a non-volatile type of memory, e.g., flash media, disk media, etc. In various aspects of the disclosure, the processor 220 may be another type of processor, such as a digital signal processor, a microprocessor, an ASIC, a graphics processing unit (GPU) configured to display results, or a GUI on a display, a field-programmable gate array (FPGA), or a central processing unit (CPU). In certain aspects of the disclosure, network inference may also be accomplished in systems that have weights implemented as memristors, chemically, or other inference calculations, as opposed to processors.

In aspects of the disclosure, the memory 230 can be random access memory, read-only memory, magnetic disk memory, solid-state memory, optical disc memory, and/or another type of memory. In some aspects of the disclosure, the memory 230 can be separate from the computing device 200 and can communicate with the processor 220 through communication buses of a circuit board and/or through communication cables such as serial ATA cables or other types of cables. The memory 230 includes computer-readable instructions that are executable by the processor 220 to operate the computing device 200. In other aspects of the disclosure, the computing device 200 may include a network interface 240 to communicate with other computers or to a server. A storage device 210 may be used for storing data.

The disclosed method may run on the computing device 200 or on a user device, including, for example, on a mobile device, a desktop device, an IoT device, or a server system.

Figure 3:
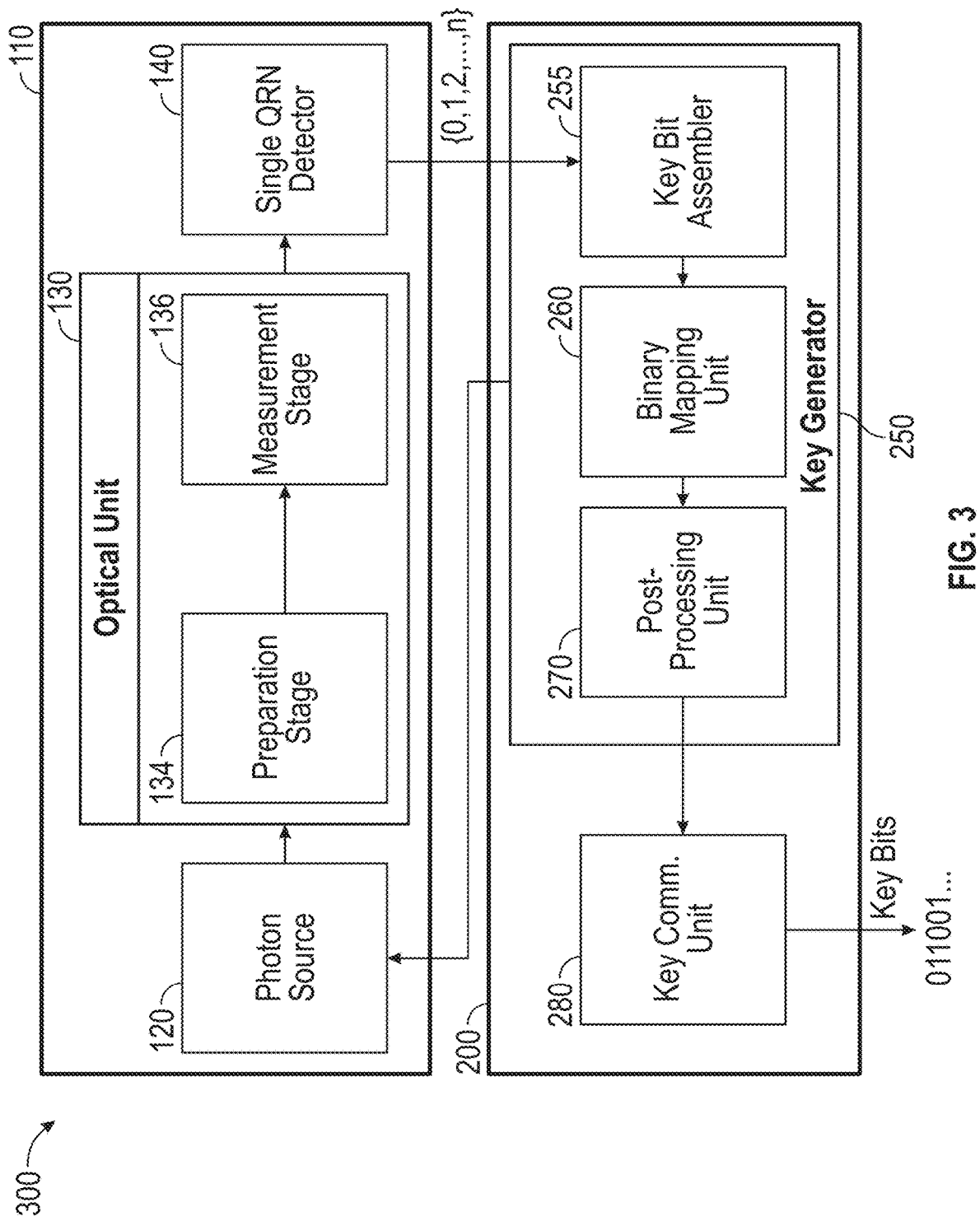
FIG. 3 is a diagram illustrating the key generator system of FIG. 1 and the applications of the computing device, in accordance with examples of the present disclosure.

Referring now to FIG. 3, the computing device 200 may further include a key generator 250 configured to generate a key based on the output from the detector 140. The key generator 250 may include a key bit assembler 255 and a binary mapping unit 260. The key generator 250 may include a postprocessing unit 270 configured to receive an output from the binary mapping unit 260. The key generator 250 projects the quantum random digits onto a binary system. The postprocessing unit 270 is optional and may include a fast Von Neumann normalization or other postprocessing algorithm required by a specific application.

The postprocessing unit 270 may perform additional mapping of the digits from the binary mapping unit 260. For example, the postprocessing unit 270 may disregard or eliminate any binary bit pairs that are the same, such as 00 and 11. Additionally, binary bit pairs 01 and 10 may be modified further to produce a 0 or a 1, for example. Nonetheless, other schemes may be used, including considering patterns of three binary bits, for example.

The system 100 can be tested from time to time. For example, random and very large samples (such as a minimum of about $2^{26}$ to about $2^{32}$ digits) of binary quantum random digits may be tested with a standard National Institute of Standards and Technology (NIST) battery of tests augmented with specific, stronger tests like Borel normality and Chaitin-Schwartz-Solovay-tests. If tests fail in a significant statistical way, then the system may be replaced, for example.

The computing device 200 may include a key communication unit 280 configured to assemble and send the generated key, including a sequence of bits, to a separate or remote device (not shown).

The key bit assembler 255, binary mapping unit 260, postprocessing unit 270, and key communication unit 280 may all include hardware, software, firmware, or a combination thereof. The key communication unit 280 may produce communication media for transmission to a remote computing device, for example.

The key bit assembler 255 of the key generator 250 may store, concatenate, or assemble the assigned values of the measurement outcomes from the measurement stage 136. The outcomes are units of a numerical base, for example, quaternary digits from the set of {0, 1, 2, 3}. The key bit assembler assembles a string of K (a positive integer) N-nary digits to be used by the binary mapping unit. For example, some keys are 32 bits, 128 bits, or 256 bits. Other keys can be 1024 bits or 2048 bits, for example, or another industry standard. As should be understood, as processing speeds of computing devices increase, the number of bits in a key may increase. The computing device 200 should have registers, buffers, and other hardware for producing a string of K bits.

The binary mapping unit transforms the string of K>0, N-nary digits into L bits through a structure-preserving mapping.

By way of a non-limiting example, the binary mapping unit generates a binary quantum random string using an alphabetic morphism algorithm, as the one provided in the following equation EQ (1), which allows $\varphi:\{0,1,2,3\}\to\{0,1\}$, where:

$$\varphi(a) = \begin{cases} 0, & \text{if } a = 0 \text{ or } a = 2 \\ 1, & \text{if } a = 1 \text{ or } a = 3 \end{cases}. \qquad \text{EQ}(1)$$

In this example, the variable "a" is a quaternary digit that corresponds to the measurement outcomes of the measurement stage. This mapping can be extended sequentially to strings, $y(l)=\varphi(x(l))$, where l is a positive integer. The output from the key generator is a string of binary bits corresponding to the generated key. The computing device may control the operation of the ND-QRNG 110 to produce the sequence of N-ary digits sufficient to generate the necessary number of binary bits for the key. By way of a non-limiting example, the key generator may control the photon source to produce the spin-1 particles, as needed to produce the number of bits for key.

The system 100 may employ a testing unit (not shown) at the output of the postprocessing unit 270 to perform a series of tests to reaffirm the quality of randomness of the generated key and deliver the key to the key communication unit upon successful testing. The testing unit may test the output-based NIST Special Publication 800-90A-90C, for example, and/or other NIST testing. The testing unit may perform other industry testing.

The generated key may be an encryption key compatible with the Advanced Encryption Standard (AES) or Data Encryption Standard (DES). Other encryption algorithms include RSA (Rivest, Shamir, Adleman) Encryption. Other encryption techniques may be used. The encryption key may be compatible with NIST standards or other industry standards.

FIG. 4 illustrates a block diagram of an optical unit 130 having a Hermitian Unitary operator implemented by a universal interferometer. The optical unit 130 includes a preparation stage 134 that receives an input from a photon source 120 and produces an output according to a selected probability distribution with p1, $p_1$, $p_2$, ..., $p_N$ that adds to 1. In aspects, probabilities may be selected in an abstract probability-like measure space that equivalently represents the physical interpretation of the measurement process attained by the system 100. The preparation stage 134 may be a generalized beam-splitter assembly that implements a Hermitian non-degenerate operator that enables certification via value indefiniteness. An example preparation stage, e.g., a beam-splitter assembly will be described in relation to FIG. 5. The beam-splitters, for example, of the beam-splitter assembly, are configured based on i) the selected probability distribution that adds to 1 and ii) a selected preparation stage 134 candidate derived based on a value definite quantum (VDQ) states equation, as will be described in more detail in relation to FIG. 7. The output from the preparation stage 134 is based on its design to be one of the candidates with an output |ψ>.

The universal interferometer, as will be described in more detail in relation to FIG. 5, is operational for any candidate state. In FIG. 5, the universal interferometer is operational for any candidate state obtained through the preparation stage 134 for any probability distribution $p_1$, $p_2$, $p_3$, $p_4$. For example, for the probability distribution ¼, ¼, ¼, ¼ and corresponding preparation state ½|3⟩+¼|4⟩, an incoming photon is received in inputs 3 and 4 with equal probabilities.

FIG. 5 illustrates a block diagram of a preparation stage 134 for a selected candidate that enables certification via value indefiniteness. The beam-splitters 410, 420 (e.g., polarizing beam splitters) and components of the preparation stage 134 may vary based on the selected candidate equation. By way of a non-limiting example, a beam-splitter assembly 503 receives a photon at the input 402 from the photon source 120 (FIG. 1) and outputs a photon in one of its two output modes with some probability. For example, for the aforementioned state $$\frac{1}{2}|1\rangle + \frac{1}{4}|2\rangle + \frac{1}{4}|3\rangle$$

one operates the beam-splitter 410, 420 as a balanced beam-splitter so it transmits and reflects the photon with equal probability in its two output modes; these modes are connected directly with inputs 603 and 604 from FIG. 6. Another example utilizes multiple beam-splitters to produce more than two outcomes; in this manner, one could prepare the state $$\frac{1}{2}|1\rangle + \frac{1}{4}|2\rangle + \frac{1}{4}|3\rangle$$

by providing as input to a second balanced beam-splitter one output from a first balanced beam-splitter, then the outputs of the second beam-splitter are connected to inputs 602 and 603 of the measurement stage 136 (FIG. 6) and the free output from the first beam splitter to the first input 601 of the measurement stage 136.

Similarly, one can generate an N-dimensional preparation state by, for example, having a plurality of beam-splitters arranged in a mesh configuration in an N-dimensional Hilbert space and an arbitrary state |ψ⟩ in that space.

The selection of preparation states generated by the preparation stage 134 is presented to the measurement stage 136, thereby achieving the aforementioned certification and attaining a probability distribution of measurement outcomes produced at the output of the measurement stage. This enables a structure-preserving mapping to take action upon the sequence generated by concatenating the measurement outcomes from the measurement stage 136 to convert such outcomes from an N-ary sequence of digits to a binary sequence of bits. As a consequence, the quality of random bits generated by the ND-QRNG 110 is provably better than the quality of quantum random bits generated by any pseudo-random number generator and with the certainty of randomness certification that any other quantum random number generator lacks.

A quantum random sequence may be expressed in bits (as is the case in most cryptographic applications), thus requiring a mapping from the N-ary digits obtained by this process to bits and noting that an event with probability zero does not guarantee its impossibility. The preparation stage in the preparation state $$\frac{1}{2}|3\rangle + \frac{1}{2}|4\rangle,$$

derived through the aforesaid process, guarantees the probability distribution ¼, ¼, ¼, ¼ of resolvable quantum states. Then, by means of an alphabetic morphism, the ternary sequence of digits generated by such aspect can be mapped into a binary sequence with equal probability of finding a zero or one when selecting a bit at random, ensuring that the generated sequence of bits is maximally unpredictable, has Borel normal prefixes and is bi-immune, that is the sequence of quantum random bits, and of any sub-sequence thereof, is strongly incomputable in the sense that no algorithm can reproduce exactly any bit of the sequence.

Referring again to FIG. 5, the preparation stage 134 produces up to N outputs, depending on the design of the preparation stage 134. In this example, the preparation stage 134 produces two outputs, which is an input into the measurement stage 136. Therefore, the other inputs in the measurement stage are blocked by at least one blocking filter 450, 455. Alternatively, the filters 450, 455 may be part of the preparation stage 134 or the measurement stage 136. The filters 450, 455 may be used to block noise, for example. In other aspects, the filters 450, 455 may be substituted with other connections to prevent noise from entering unused ports of the measurement stage 136. However, it should be understood that some configurations of the preparation stage 134 may use any number of the N input ports of the universal interferometer described herein according to the Candidate with an output |ψ⟩.

The H beam-splitter 503 assembly includes beam-splitters 410, 420 constructed and arranged to split a single photon or other spin-1 received on input of the beam-splitter assembly 503. The outputs of the beam-splitter assembly may be represented as a |1⟩, |2⟩, |3⟩, . . . , |N⟩ corresponding to the standard Cartesian basis. It should be understood that the term "|1⟩" is not equivalent to a binary bit of 1. One possibility of the example with a probability distribution set of ¼, ¼, ¼, ¼ is achieved with the preparation state ½|3⟩+½|4⟩, and it should be understood that other options exist according to the candidates below 1 and for other probability distribution sets, according to its candidates.

Referring to FIG. 6, the measurement stage 136 may be configured to generate numbers and outcomes attained by measuring the state of a particle utilized to prepare an N-dimensional quantum system in a state that satisfies a set of conditions that guarantees there is no definite value associated to the measurement outcome. The measurement stage 136 may be configured to always guarantee the Borel normality and provable maximal unpredictability of the sequence generated by concatenating the measurement outcomes described therein. This may provide a clear advantage over prior quantum random number generators, where the claimed unpredictability of measurement outcomes is dependent on unproved assumptions regarding indeterminism in quantum mechanics. The measurement stage 136 generally is comprised of phase shifters 620 and beam splitters 630.

The measurement stage 136 may include a universal interferometer as shown in FIG. 6. The universal interferometer includes six two-dimensional (2D) interferometers 650, connected and arranged to measure according to a Hermitian Unitary operator of a Cartesian coordinate standard system the prepared photon and preserving the three-dimensions of observable/quantum information in the Hilbert space of the prepared photon and the four-dimensions of observable/quantum information of the quantum system. The universal interferometer may include four output ports 611-614 that produce a measured photon according to four-dimensional eigenstates of the measurement operator (i.e., measurement outcomes with corresponding eigenstates $|1_m\rangle, |2_m\rangle, |3_m\rangle, |4_m\rangle$.

The universal interferometer may include N input ports 601-604. In aspects, the universal interferometer may receive at least one input from the preparation stage 134, and one or more of the input ports may be blocked.

A Hermitian operator with non-degenerate spectra is used to perform the first measurement to complete the preparation state and obtain the inputs for the measurement stage. In aspects, an operator with eigenvectors corresponding to the standard Cartesian basis is selected. The spin operator corresponding to the working dimension will yield such a basis.

As a non-limiting example, in the case of dimension four, the spin-3/2 operator may be utilized. One with ordinary skill in the art may note that alternative operators are equivalent to the operator of choice in an aspect up to a change of basis. A different operator is chosen for the second measurement. This operator may be chosen among any Unitary Hermitian operator with at least two distinct eigenvalues. An aspect utilizes the operator corresponding to the symmetric multi-port beam-splitter in dimension four with a phase of pi, that is $e^{i\pi}=-1$. This operator is given by:

$$U_m = \frac{1}{2}\begin{pmatrix} 1 & 1 & 1 & 1 \\ 1 & -1 & -1 & 1 \\ 1 & -1 & 1 & -1 \\ 1 & 1 & -1 & -1 \end{pmatrix}$$

The first measurement (preparation stage) initializes the quantum system to a linear combination of eigenstates of the chosen operator, and the second measurement is performed in the eigenbasis corresponding to $U_m$. Since a photon is prepared in a state corresponding to a linear combination of N-dimensional eigenvectors and measured in a different N-dimensional basis, the value indefiniteness of its measurement outcomes is guaranteed if the preparation state satisfies the aforementioned conditions; due to the dimensionality, N quantum states are resolvable outcomes with probability distribution dependent on the preparation state.

In some aspects, a user may generate by different methods quantum states in any complex Hilbert space of dimension larger than two, therefore satisfying the previously described conditions for value indefiniteness. In addition, one may generate by different methods a number of resolvable quantum states and corresponding probability distributions based on the dimensionality of the chosen Hilbert space. In this case, the characteristics of the chosen quantum state must remain as described in this document for an aspect of this disclosure to preserve its value indefiniteness. One skilled in the art will note that alternative formulations do not require the second measurement operator to be unitary, only Hermitian with at least two distinct eigenvalues, if the physical apparatus chosen to construct it does not need to follow a unitary decomposition.

The preparation state that yields the desired probability distribution of the resolvable output quantum states can be derived by resolving the system of equations corresponding to the unitary operator describing the behavior of the operator used to generate the quantum state, where the solutions correspond to the probabilities of resolvable quantum states one wishes to obtain; here, it is needed to ensure that candidate states obtained by this process satisfy the previously stated requirements. Alternative aspects may prefer other probability distributions. Noting that that practicality often requires a quantum random sequence to be expressed in bits, thus requiring a mapping from the qubits obtained by this process to qubits, an aspect of the present method, in the case of dimension four, consists on preparing the described quantum system in the state $$\frac{1}{2}|3\rangle + \frac{1}{2}|4\rangle,$$

derived through the aforesaid process, in order to obtain the probability distribution ¼, ¼, ¼, ¼ of resolvable quantum states. Then, by means of an alphabetic morphism, the quaternary sequence generated by such aspect can be mapped into a binary sequence with equal probability of finding a zero or one when selecting a bit at random, ensuring that the generated sequence of bits is maximally unpredictable, has Borel normal prefixes and is bi-immune, that is the sequence of quantum random bits, and of any sub-sequence thereof, is incomputable.

Another aspect includes decomposing the N-dimensional unitary operator describing the quantum system in the N-dimensional complex Hilbert space into a product of physically realizable two-dimensional operators. An abstract example consists of photons are prepared in the states $$\frac{1}{2}|3\rangle + \frac{1}{2}|4\rangle,$$

corresponding to a ½ of an incoming photon on inputs 3 and 4 and from which photons traverse a mesh of phase shifters and beam splitters into a photon detector where they appear in the four output ports with probabilities ¼, ¼, ¼, ¼, thus providing the aforementioned advantages to the sequences of random bits generated in this manner.

An advantageous alternative (due to ease and low cost of implementation) of non-limiting examples for the choice of photon source and implementation of two-dimensional operators is given by an attenuated laser and half-silvered mirrors, respectively. To achieve the two-dimensional decomposition in such an alternative aspect we null non-diagonal elements of the unitary matrix representing the state of the quantum system by right multiplying the inverses of matrices $T_{p,g}$ corresponding to the identity matrices with elements $I_{p,p}$, $I_{p,q}$, $I_{q,p}$, and $I_{q,q}$ replaced by the matrix of a lossless beam splitter and external phase shifter of the form $$\begin{pmatrix} u' \\ v' \end{pmatrix} = \begin{pmatrix} e^{i\phi}\cos\theta & -\sin\theta \\ e^{i\phi}\sin\theta & \cos\theta \end{pmatrix}\begin{pmatrix} u \\ v \end{pmatrix}$$

where transmittance and reflectivity parameters are described within the unitary matrix and the input state and output states are represented with modes (u, v) and (u', v'), respectively.

For the example of a unitary operator corresponding to the four-dimensional quantum system represented in the aspect illustrated in FIG. 5, the following phase and reflectivity parameters provide a physically realizable two-dimensional decomposition in terms of beam splitter matrices where $BS_{i,j}$ represents the beam splitter between modes i and j, θ represents the angle and φ represents the phase shift:

| Beam splitter | θ | φ |
|---|---|---|
| $BS_{1,2}$ | $\frac{\pi}{4}$ | 0 |
| $BS_{3,4}$ | $\frac{\pi}{4}$ | −π |
| $BS_{2,3}$ | $\frac{\pi}{4}$ | 0 |
| $BS_{1,2}$ | $\frac{\pi}{2}$ | −π |
| $BS_{3,4}$ | $\frac{\pi}{2}$ | 2.55 |
| $BS_{2,3}$ | $\frac{\pi}{4}$ | π |

Alternative decompositions can be achieved by left and right multiplying the matrices and inverses of matrices of beam splitters and external phase shifters of the previously described form in order to increase loss tolerance, minimize physical footprint or address additional aspects of the goal for such aspect. The matrices comprising the aforesaid aspect represent a generalized rotation through the decomposition of the unitary matrix and preserve the advantageous properties of the aspects of the aspect described above, illustrated as an example in FIG. 4.

Figure 7:
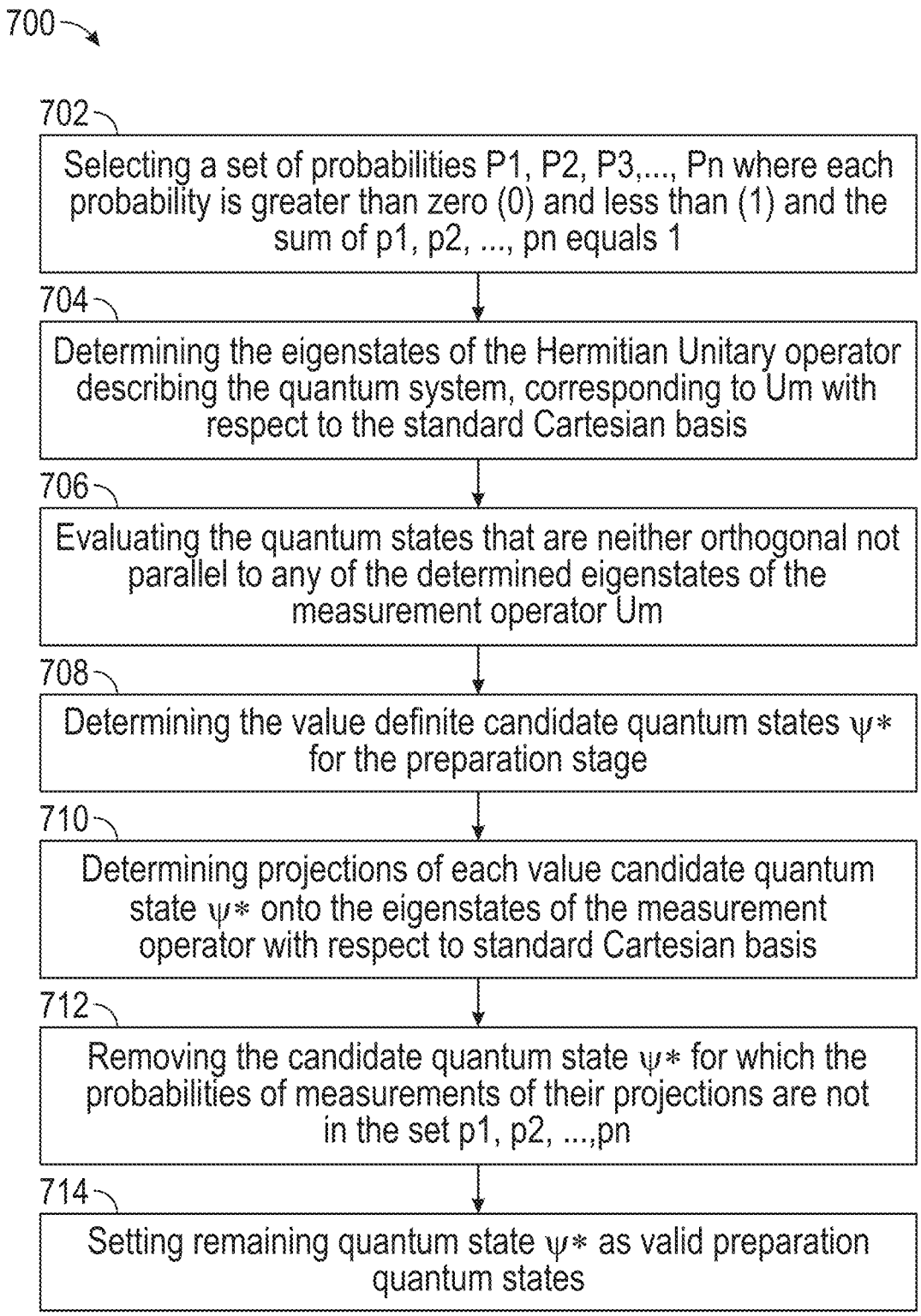
FIG. 7 is a flow diagram illustrating a method for generating random numbers using the system of FIG. 1, in accordance with examples of the present disclosure.

FIG. 7 shows a block diagram for an exemplary method 700 for quantum random number generation. Although the steps of FIG. 7 are shown in a particular order, the steps need not all be performed in the specified order, and certain steps can be performed in any suitable order. For example, FIG. 7 will be described below, with a computing device 200 (FIG. 2) performing portions of the operations. In various aspects, the operations of FIG. 7 may be performed, all or in part, by the system of FIG. 1 and the computing device 200 of FIG. 2. In aspects, the operations of FIG. 7 may be performed, in part, by another device, for example, a mobile device and/or a client computer system.

At block 702, the system 100 selects a set of probabilities P1, P2, P3, ..., PN, where each probability is greater than zero (0) and less than (1) and the sum of p1, p2, ..., pN equals 1.

At block 704, the system 100 determines the eigenstates of the Hermitian Unitary operator describing the quantum system, corresponding to $U_m$ with respect to the standard Cartesian basis.

At block 706, the system 100 evaluates the quantum states that are neither orthogonal nor parallel to any of the determined eigenstates of the measurement operator Um.

At block 708, the system 100 determines the value definite candidate quantum states for the preparation stage.

At block 710, the system 100 determines projections of each value candidate quantum state onto the eigenstates of the measurement operator with respect to standard Cartesian basis.

At block 712, the system 100 removes the candidate quantum state for which the probabilities of measurements of their projections are not in the set p1, p2, ..., pN.

At block 714, the system 100 sets the remaining quantum state(s) as valid preparation quantum state(s).

FIG. 8 shows a block diagram for an exemplary method 850 for quantum random number generation. Although the steps of FIG. 8 are shown in a particular order, the steps need not all be performed in the specified order, and certain steps can be performed in any suitable order. For example, FIG. 8 will be described below, with a computing device 200 (FIG. 2) performing portions of the operations. In various aspects, the operations of FIG. 8 may be performed, all or in part, by the system of FIG. 1 and the computing device 200 of FIG. 2. In aspects, the operations of FIG. 8 may be performed, in part, by another device, for example, a mobile device and/or a client computer system.

At block 852, the system 100 receives photons on at least one of N input ports of a universal interferometer of an measurement stage 136 (FIG. 6) of the optical unit 130 (FIG. 1). Each input port of the measurement stage 136 is configured to receive a corresponding prepared photon having three or more dimensions of quantum information in Hilbert space from a preparation stage of the ND-QRNG. Each corresponding prepared photon is prepared based on a selected probability distribution set selected from probability distribution sets of p1, p2, ... pN that add to 1 and where the p1, the p2, ..., the pN are rational numbers less than 1 and greater than zero.

At block 854, the system 100 measures, by n(n−1)/2 two-dimensional (2D) interferometers of the universal interferometer of measurement stage 136, along a Hermitian Unitary operator of a Cartesian coordinate standard system the prepared photon and preserving the three dimensions of the quantum information the Hilbert space of the measured photon.

At block 856, the system 100 produces at one output port of N output ports of the universal interferometer of measurement stage 136 a measured photon corresponding to an N-dimensional eigenstate.

In aspects, the n-dimensional eigenstate may be communicated to computing device 200 for further processing.

Figure 9:
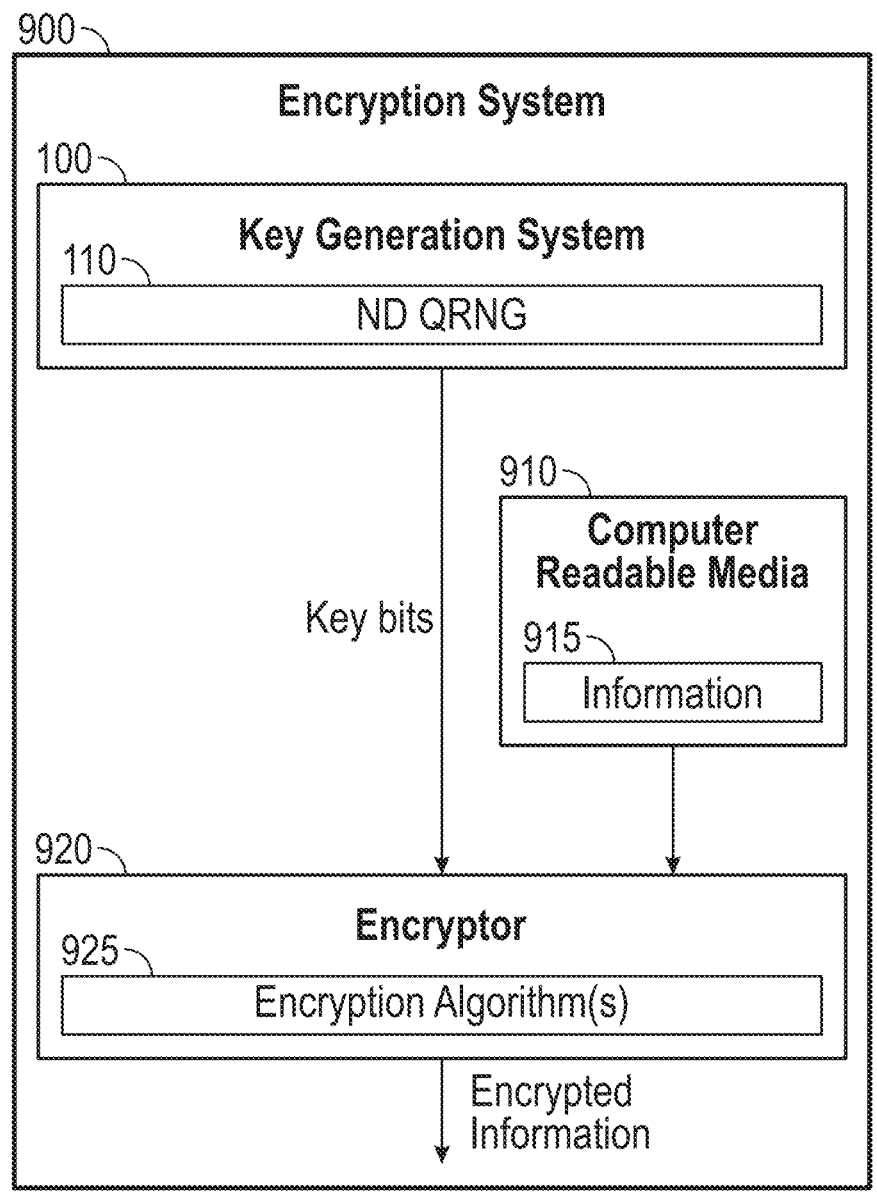
FIG. 9 is a diagram illustrating an example encryption system, in accordance with examples of the present disclosure.

FIG. 9 illustrates an example encryption system 900 using the system of FIG. 1. The output of the universal N-dimensional quantum random number generator 110 is transmitted as key bits to an encryptor 920. The encryptor 920 encrypts information 915 using the key bits by using an encryption algorithm 925. The information 915 may be stored on computer readable media 910. The resultant encrypted information may then be transmitted or stored.

Figure 10:
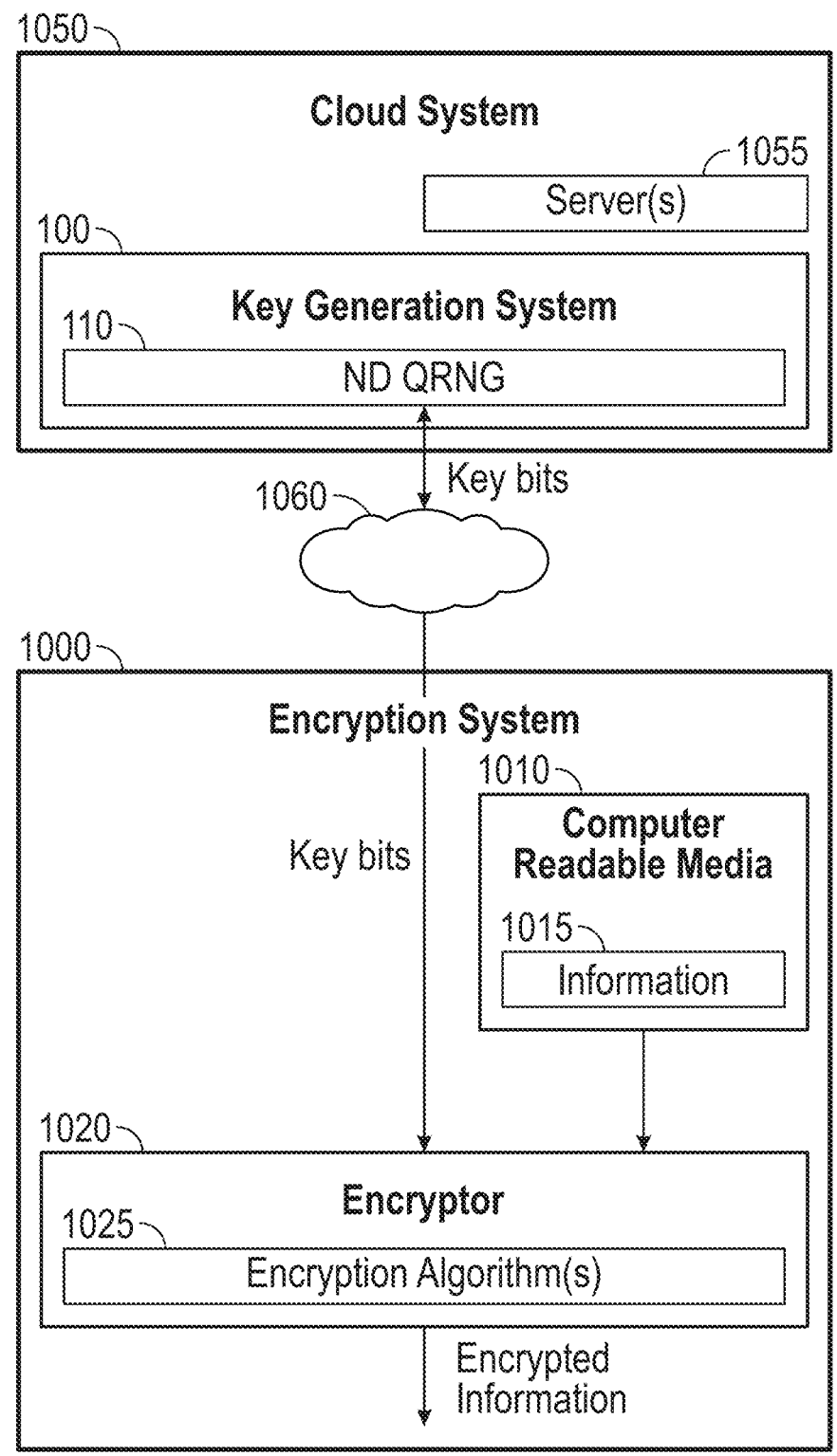
FIG. 10 is a diagram illustrating another example encryption system, in accordance with examples of the present disclosure.

FIG. 10 is a diagram illustrating another example encryption system 1000 using the system of FIG. 1. Cloud system 1050 includes a universal N-dimensional quantum random number generator 110 and an encryption system 1000. Cloud system 1050 includes a universal N-dimensional quantum random number generator 110 (FIG. 1) and a server 1055. The output of the universal N-dimensional quantum random number generator 110 is transmitted as key bits to the cloud 1060.

Encryption system 1000 generally includes an encryptor 1020 configured to encrypt information using an encryption algorithm. The encryptor 1020 encrypts information 1015 based on encryption algorithm 1025 that uses the key bits generated by the cloud system 1050. The information 1015 may be stored on computer readable media 1010. The resultant encrypted information may then be transmitted or stored.

Figure 11:
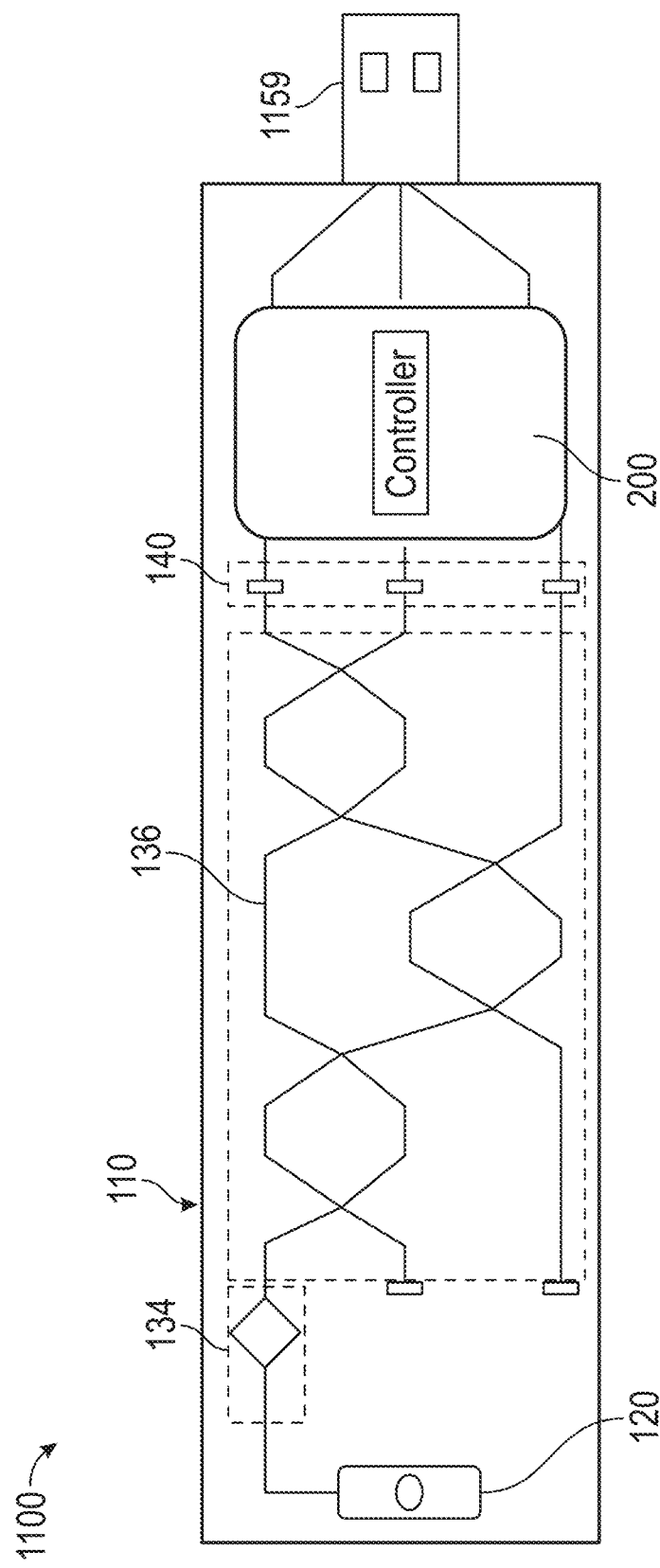
FIG. 11 is a diagram of a layout of an example implementation of the encryption system of FIG. 9, in accordance with examples of the present disclosure.

FIG. 11 is an example implementation of the encryption system 1100 of FIG. 9. Photon source 120 generates photons, for example, using an attenuated laser. The photons are transmitted to the preparation stage 134 which generates an N-dimensional preparation state, which is described in detail with respect to FIG. 5. The measurement stage 136 (FIG. 6) receives the selection of preparation states generated by the preparation stage 134. The results of the measurement stage 136 are output to one or more detectors 140 which are configured to output a sequence of N-ary numbers from the set {0, 1, 2, ..., N}, for example. These results are communicated to the computing device 200 (e.g., a controller) for further processing, for example generating key bits.

The encryption system 1100 may include a USB port 1159 (or other data connection such as ethernet, Wi-Fi, and/or Bluetooth®). The generated key bits may be transmitted by the computing device 200 via the USB port 1159.

Figure 12:
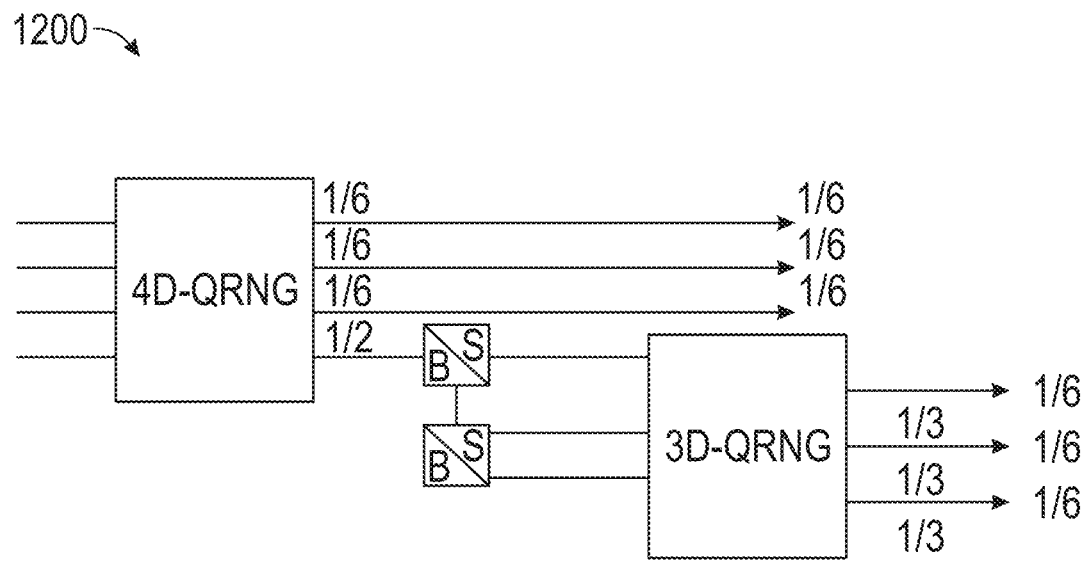
FIG. 12 is a diagram illustrating an example of a (N+1)-QRNG by means of a cascading arrangement of N-QRNGs, in accordance with examples of the present disclosure.

FIG. 12 illustrates the construction of a (N+1)-QRNG by means of a cascading arrangement of N-QRNGs. In this non-limiting example, a 6-dimensional QRNG is constructed by means of a 4-QRNG and a 3-QRNG fabricated as described in this patent. In this example one of the outputs of the 4-dimensional QRNG is provided as input to the preparation stage of a 3-dimensional QRNG. In some aspects one may build any N-dimensional QRNG with N>4, by cascading at least two lower dimensional QRNGs where $N_1, N_2, \ldots$ corresponds to their dimensions and $N_1 + N_2 + \ldots > N$. In such aspects, value indefiniteness is preserved as each cascaded QRNG preserves value indefiniteness.

Figure 13:
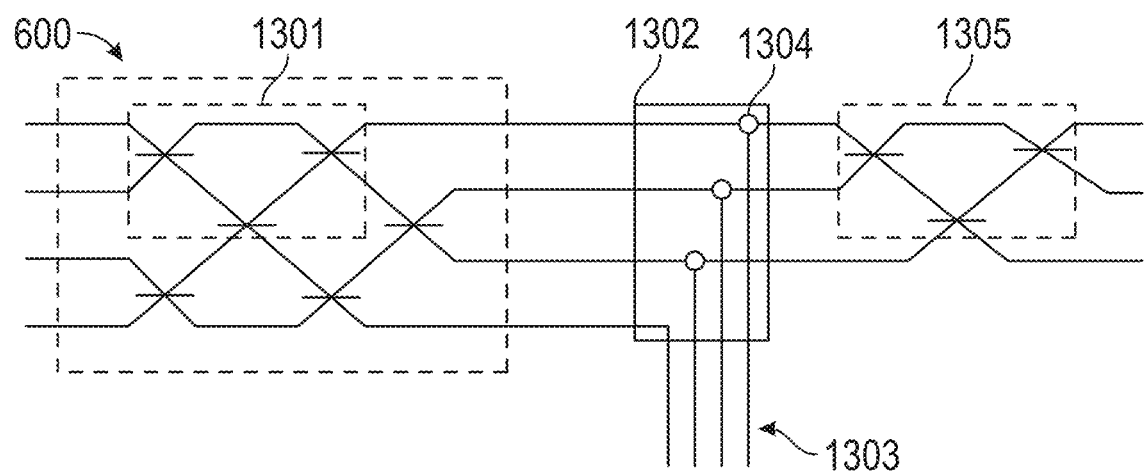
FIG. 13 is a diagram illustrating appending unitary operators to act as a physical preprocessing or postprocessing of the Hermitian unitary operator, in accordance with examples of the present disclosure.

Referring to FIG. 13, the present disclosure enables the construction of larger high-dimensional systems for generating quantum random numbers certified via value indefiniteness. In aspects, unitary operators may be prepended or appended to act as a physical preprocessing or postprocessing of the Hermitian unitary operator corresponding to the measurement stage without disturbing the value indefiniteness of the outcomes. In aspects, multiple high-dimensional QRNGs constructed as described in the present disclosure may be cascaded to generate larger systems. These capabilities are achievable not only by a modular cascading arrangement of individual devices but also by embedding the construction of the desired operators in a sufficiently large universal N-dimensional QRNG.

To select a suitable preprocessing or postprocessing operator, any unitary operator U' of equal dimension may be chosen such that the eigenvalues of the measurement operator U it is acting on coincide with the eigenvalues of the resulting operator U'U. For example, a postprocessing operator may physically implement an alphabetic morphism such as previously described. An alternative example consists of an operator performing an alphabetic morphism on a 3-dimensional QRNG to yield binary outcomes from the universal 3-dimensional interferometer.

This operator is given by:

$$U' = \frac{1}{2\sqrt{2}} \begin{pmatrix} 1+\sqrt{2} & \sqrt{2} & 1-\sqrt{2} \\ 1-\sqrt{2} & \sqrt{2} & 1+\sqrt{2} \\ \sqrt{2} & -2 & \sqrt{2} \end{pmatrix}$$

FIG. 13, illustrates a non-limiting example of the capabilities described herein. A 3-dimensional QRNG 1301 may be embedded to the 4-dimensional QRNG (FIG. 6) of the cascading arrangement based on FIG. 12. In aspects, a control unit 1302 may be added, for example, by a simple arrangement of beam splitters, filters and detectors to select between two operations. In aspects, the computing device 200 may control the control unit 1302. For example, in one mode of operation, the outcomes of the 4D-QRNG (i.e., the measurement stage 136 of FIG. 6) may be directed undisturbed by control elements 1304 to the outputs of the control unit 1303 enabling the operation of the device as 4D-QRNG. In an alternative mode of operation, output 614 may be ignored and the remaining outputs may be connected by the control elements 1304 to the inputs of the universal 3D-interferometer 1305 which may be constructed as described in the present disclosure.

By changing the appropriate phase values to operate the embedded 3-dimensional QRNG and setting the control unit to connect the unfiltered outputs of the embedded 3-dimensional QRNG to the inputs of a second 3-dimensional universal interferometer, one may set the universal interferometer to implement the aforementioned unitary operator U'. Thus, enabling the system 100 to operate as a 3-dimensional QRNG implementing the operator U'U to generate value-indefinite binary outcomes. Alternatively, the system 100 may be operated as a 6-dimensional QRNG by operating the first component as a 4-dimensional QRNG and setting the control unit 1302 to direct undisturbed two of the outputs from the 4D-QRNG and the remaining control unit to connect to its corresponding input of the 3D-universal interferometer 1305 as in FIG. 12 to cascade an additional 3D universal interferometer operating as a 3D-QRNG.

To illustrate the construction of the system 100 to allow for high-fidelity reproduction, the system 100 is described using a single photon source as photon source 120 and an arrangement of linear optical components. It is contemplated that the photon source 120 may include a coherent light source, heralded photon arrangements, entangled photons, superconducting transmons, and/or quantum dots. In aspects, the system 100 may be built employing a synthetic equivalent to the photonic system described herein; this is achievable by means of, but not limited to, simulation methods for quantum systems through the use of trapped ions, cold atoms and complex classical and hybrid classical-quantum computer simulation techniques for N-dimensional quantum systems.

Certain aspects of the present disclosure may include some, all, or none of the above advantages and/or one or more other advantages readily apparent to those skilled in the art from the drawings, descriptions, and claims included herein. Moreover, while specific advantages have been enumerated above, the various aspects of the present disclosure may include all, some, or none of the enumerated advantages and/or other advantages not specifically enumerated above.

The aspects disclosed herein are examples of the disclosure and may be embodied in various forms. For instance, although certain aspects herein are described as separate aspects, each of the aspects herein may be combined with one or more of the other aspects herein. Specific structural and functional details disclosed herein are not to be interpreted as limiting, but as a basis for the claims and as a representative basis for teaching one skilled in the art to variously employ the present disclosure in virtually any appropriately detailed structure. Like reference numerals may refer to similar or identical elements throughout the description of the figures.

The phrases "in an aspect," "in aspects," "in various aspects," "in some aspects," or "in other aspects" may each refer to one or more of the same or different example aspects provided in the present disclosure. A phrase in the form "A or B" means "(A), (B), or (A and B)." A phrase in the form "at least one of A, B, or C" means "(A); (B); (C); (A and B); (A and C); (B and C); or (A, B, and C)."

It should be understood that the foregoing description is only illustrative of the present disclosure. Various alternatives and modifications can be devised by those skilled in the art without departing from the disclosure. Accordingly, the present disclosure is intended to embrace all such alternatives, modifications, and variances. The aspects described with reference to the attached drawing figures are presented only to demonstrate certain examples of the disclosure. Other elements, steps, methods, and techniques that are insubstantially different from those described above and/or in the appended claims are also intended to be within the scope of the disclosure.

What is claimed is:

1. A key generator system, comprising:
   a photon source configured to generate a particle;
   an N-dimensional quantum random number generator (ND-QRNG), wherein N>3, including:
      an optical unit including:
         a preparation stage configured to enable certification via value indefiniteness; and
         a measurement stage configured to generate numbers and outcomes attained by measuring a state of a particle utilized to prepare an N-dimensional quantum system in a state that satisfies a set of conditions that guarantees there is no definite value associated to the measurement outcome; and
         a detector configured to output a sequence of N-ary numbers;
   a processor; and
   a memory, including instructions stored thereon, which, when executed by the processor cause the system to:
      generate, by the photon source, a particle;
      receive the particle by the optical unit;
      generate by the optical unit a set of outcomes based on the state of the particle;
      detect by the detector the set of outcomes;
      output by the detector a sequence of N-ary numbers based on the detected set of outcomes;
      receive one or more photons on at least one input port of a universal interferometer of the measurement stage of the optical unit; and
      measure, using $N(N-1)/2$ two-dimensional (2D) interferometers of the universal interferometer of the measurement stage, along a Hermitian Unitary operator of a Cartesian coordinate standard system the one or more photons prepared by the preparation stage and preserving three dimensions of quantum information in a Hilbert space of the received one or more photons.

2. The key generator system of claim 1, wherein the instructions, when executed by the processor, cause the preparation stage to:
   select a set of probabilities, wherein each probability of the set of probabilities is greater than zero and less than one and a sum of the set of probabilities equals one; and
   determine one or more eigenstates of a Hermitian Unitary operator describing the quantum system, wherein the Hermitian Unitary operator corresponds to $U_m$ with respect to a standard Cartesian basis.

3. The key generator system of claim 2, wherein the instructions, when executed by the processor, further cause the preparation stage to:
   evaluate quantum states that are neither orthogonal nor parallel to any of the determined one or more eigenstates of measurement operator $U_m$; and
   determine projections of each value candidate quantum state onto the one or more eigenstates of the measurement operator with respect to standard Cartesian basis.

4. The key generator system of claim 3, wherein the instructions, when executed by the processor, further cause the preparation stage to:
   remove the candidate quantum state for which the probabilities of measurements of their projections are not in the set p1, p2, . . . , pN.

5. The key generator system of claim 4, wherein the instructions, when executed by the processor, further cause the preparation stage to:
   set the remaining quantum state as a valid preparation quantum state.

6. The key generator system of claim 1, wherein the instructions, when executed by the processor, further cause the measurement stage to:
   produce at an output port of a plurality of output ports of the universal interferometer a measured photon corresponding to an N-dimensional eigenstate.

7. The key generator system of claim 1, wherein each input port of the universal interferometer is configured to receive a corresponding prepared photon having three or more dimensions of quantum information in Hilbert space from the preparation stage of the ND-QRNG.

8. The key generator system of claim 1, wherein each corresponding prepared photon is prepared based on a selected probability distribution set selected from probability distribution sets of p1, p2, . . . pN that add to 1 and where the p1, the p2, . . . , the pN are rational numbers less than 1 and greater than zero.

9. The key generator system of claim 1, wherein the ND-QRNG includes N input ports where Nis larger than two, and wherein each input port is configured to receive at least one prepared photon having three dimensions of quantum information in Hilbert space from a preparation stage of the ND-QRNG.

10. The key generator system of claim 1, wherein the instructions, when executed by the processor, further cause the system to:
    generate a key based on the sequence of N-ary numbers; and
    encrypt information based on the key.

11. A processor-implemented method for generating a key, comprising:
    generating, by a photon source, a simulating a high-dimensional particle;
    receiving the simulating a high-dimensional particle by an optical unit;
    generating by the optical unit a set of outcomes based on the state of the simulating a high-dimensional particle;
    detecting by a detector the set of outcomes;
    outputting by the detector a sequence of N-ary numbers based on the detected set of outcomes;
    receiving one or more photons on at least one input port of a universal interferometer of a measurement stage of the optical unit; and
    measuring, using $N(N-1)/2$ two-dimensional (2D) interferometers of the universal interferometer of the measurement stage, along a Hermitian Unitary operator of a Cartesian coordinate standard system the one or more photons prepared by a preparation stage the optical unit and preserving three dimensions of quantum information in a Hilbert space of the received one or more photons.

12. The processor-implemented method of claim 11, further comprising:
    selecting a set of probabilities, wherein each probability of the set of probabilities is greater than zero and less than one and a sum of the set of probabilities equals one; and
    determining one or more eigenstates of a Hermitian Unitary operator describing the quantum system, wherein the Hermitian Unitary operator corresponds to $U_m$ with respect to a standard Cartesian basis.

13. The processor-implemented method of claim 11, further comprising:

evaluating quantum states that are neither orthogonal nor parallel to any of the determined one or more eigenstates of measurement operator $U_m$; and determining projections of each value candidate quantum state onto the one or more eigenstates of the measurement operator with respect to standard Cartesian basis.

14. The processor-implemented method of claim 13, further comprising:

removing the candidate quantum state for which the probabilities of measurements of their projections are not in the set p1, p2, . . . , pN.

15. The processor-implemented method of claim 14, further comprising:

setting the remaining quantum state as a valid preparation quantum state.

16. The processor-implemented method of claim 15, further comprising:

producing at an output port of a plurality of output ports of the universal interferometer a measured photon corresponding to an N-dimensional eigenstate.

17. The processor-implemented method of claim 11, further comprising:

generating a key based on the sequence of N-ary numbers; and encrypting information based on the key.

18. A key generator device, comprising:

a laser configured to generate photons;

an N-dimensional quantum random number generator (ND-QRNG), wherein N>3, including:

a preparation stage configured to generate a selection of N-dimensional preparation states based on the generated photons; and a measurement stage configured to receive the selection of N-dimensional preparation states generated by the preparation stage and generate a string of K>0 N-nary digits as measurement outcomes, wherein the measurement stage is further configured to:

receive one or more photons on at least one input port of a universal interferometer of the measurement stage; and measure, using N(N−1)/2 two-dimensional (2D) interferometers of the universal interferometer of the measurement stage, along a Hermitian Unitary operator of a Cartesian coordinate standard system the one or more photons prepared by the preparation stage and preserving three dimensions of quantum information in a Hilbert space of the received one or more photons;

one or more detectors configured to output a sequence of N-ary numbers based on the measurement outcomes; and a computing device configured to generate key bits based on the sequence of N-ary numbers, the computing device including:

a key bit assembler configured to at least one of store, concatenate, or assemble a string of K>0 N-nary digits of the measurement outcomes from the measurement stage;

a binary mapper configured to transform the string of K>0, N-nary digits into L bits through a structure-preserving mapping; and a key communicator configured to produce communication media for transmission to a remote computing device; and a data port configured to transmit the generated key from the computing device.

* * * * *